United States Patent
Hsieh et al.

(10) Patent No.: US 10,824,068 B2
(45) Date of Patent: Nov. 3, 2020

(54) PHOSPHOR WHEEL AND PROJECTOR USING THE PHOSPHOR WHEEL

(71) Applicant: Coretronic Corporation, Hsin-Chu (TW)

(72) Inventors: Chi-Tang Hsieh, Hsin-Chu (TW); Haw-Woei Pan, Hsin-Chu (TW); Pi-Tsung Hsu, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 98 days.

(21) Appl. No.: 16/182,088

(22) Filed: Nov. 6, 2018

(65) Prior Publication Data

US 2019/0137858 A1 May 9, 2019

(30) Foreign Application Priority Data

Nov. 7, 2017 (CN) .......................... 2017 1 1082915

(51) Int. Cl.
  *G03B 21/20* (2006.01)
  *G02B 26/00* (2006.01)
  *G03B 33/08* (2006.01)

(52) U.S. Cl.
  CPC ....... *G03B 21/2066* (2013.01); *G02B 26/008* (2013.01); *G03B 21/204* (2013.01); *G03B 33/08* (2013.01); *G03B 21/208* (2013.01)

(58) Field of Classification Search
  CPC . G02B 26/008; G03B 21/204; G03B 21/2066
  See application file for complete search history.

(56) References Cited

U.S. PATENT DOCUMENTS

| | | | |
|---|---|---|---|
| 10,409,149 B2* | 9/2019 | Nagase | G03B 21/204 |
| 2013/0322056 A1 | 12/2013 | Konuma et al. | |
| 2015/0098065 A1* | 4/2015 | Tanaka | G03B 21/2013 353/84 |
| 2016/0077325 A1 | 3/2016 | Tsai et al. | |
| 2017/0052362 A1* | 2/2017 | Chou | F21V 9/30 |
| 2017/0261844 A1* | 9/2017 | Kitade | G03B 33/08 |
| 2017/0269464 A1* | 9/2017 | Tsai | G03B 21/204 |
| 2018/0373023 A1* | 12/2018 | Fujii | G02B 5/0278 |

FOREIGN PATENT DOCUMENTS

| | | |
|---|---|---|
| CN | 101836160 B | 2/2012 |
| CN | 102707551 B | 4/2015 |
| CN | 104880897 A | 9/2015 |

* cited by examiner

*Primary Examiner* — Leah Simone Macchiarolo

(57) ABSTRACT

The invention discloses a phosphor wheel, and a projector using the phosphor wheel. The projector includes an illumination system, a light valve, and a projection lens. The illumination system is used to provide an illumination beam. The light valve is disposed on a transmission path of the illumination beam and converts the illumination beam into an image beam. The projection lens is disposed on a transmission path of the image beam. The illumination system includes an excitation light source and a phosphor wheel. The excitation light source is used to provide an excitation beam to the phosphor wheel. The phosphor wheel includes a motor, a disk plate, a reflection member, and at least one phosphor layer. The motor has a shaft. The disk plate is connected to the shaft. In the invention, the phosphor wheel has better reliability and rigidity, and has the effect of enhancing heat dissipation.

18 Claims, 7 Drawing Sheets

PHOSPHOR WHEEL AND PROJECTOR USING THE PHOSPHOR WHEEL

CROSS-REFERENCE TO RELATED APPLICATION

THIS APPLICATION CLAIMS THE PRIORITY BENEFIT OF CHINA APPLICATION (CN201711082915.1 FILED ON 2017 Nov. 7). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a phosphor wheel, and a projector using the phosphor wheel.

BACKGROUND OF THE INVENTION

A projector is a relatively mature product and is further developed with the technology evolution and innovation. The image resolution has been improved greatly from the early VGA (640×480), SVGA (1024×768) all the way to the current 1080p (1920×1080), 4K (3840×2160). The ratio of the projection distance to the screen size, i.e., the throw ratio, is also reduced from the early 1.6 to recent 0.25.

Meanwhile, with the increasingly various requirements about luminance, degree of color saturation, lifetime, innocuity, environmental protection, and the like for a projection apparatus in the market, the light source of the projection apparatus has ranged from an ultra-high pressure mercury lamp (UHP lamp), a light emitting diode (LED) further to a laser diode (LD) light source.

Currently, with the high cost of a high luminance red laser or green laser diode, a blue laser diode is usually adapted. The phosphor on a phosphor wheel is excited to generate yellow light and/or green light, the desired red light is obtained after passing through a filter wheel, and with the blue light emitted from the blue laser diode, the three primary colors (red, green, and blue) are then used to constitute the projection picture.

The phosphor wheel is an extremely important element in a projection apparatus which currently uses a laser diode as a light source, and the phosphor wheel acts to partially convert the blue light emitted from the blue laser diode into yellow and/or green light. The light conversion efficiency of the phosphor decreases as the temperature increases, and the phosphor may be even burned out when temperature increases above a threshold, resulting in the breakdown of light converting. Therefore, how to increase the efficiency of heat dissipation either by improving the phosphor wheel itself or by promoting the heat exchange between the phosphor wheel and the external environment is an important issue. In addition, since the phosphor wheel is a high-speed rotating element, the disk plate is necessarily to have sufficient rigidity and dynamic balance ability, so that it may rotate continuously and reliably.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a phosphor wheel, which has a desirable reliability.

One of the embodiments provides a phosphor wheel with a groove disposed at the disk plate and a reflection member disposed in the groove. By the weight of the reflection member and that of the phosphor layer selectively disposed, the overall weight configuration of the disk plate may then be set such that the disk plate may rotate well with dynamic balance.

The invention provides a projector, in which a phosphor wheel has better reliability.

Other objectives and advantages of the invention can be further understood from the technical features disclosed in the invention.

In order to achieve one or a portion of or all of the objectives or other objectives, the invention provides a phosphor wheel, including a motor, a disk plate, a reflection member, and at least one phosphor layer. The motor has a shaft. The disk plate is connected to the shaft. The disk plate has a bearing surface. An annular irradiation zone is located at the periphery of the bearing surface. A groove is disposed on the bearing surface. The groove is partially located at the annular irradiation zone. The reflection member is disposed at the groove. The at least one phosphor layer is disposed at the annular irradiation zone.

In order to achieve one or a portion of or all of the objectives or other objectives, the invention provides a projector, including an illumination system, a light valve, and a projection lens. The illumination system is used to provide an illumination beam. The light valve is disposed on a transmission path of the illumination beam and converts the illumination beam into an image beam. The projection lens is disposed on a transmission path of the image beam. The illumination system includes an excitation light source and a phosphor wheel. The excitation light source is used to provide an excitation beam. The phosphor wheel is disposed on a transmission path of the excitation beam. The phosphor wheel includes a motor, a disk plate, a reflection member, and at least one phosphor layer. The motor has a shaft. The disk plate is connected to the shaft. The disk plate has a bearing surface. An annular irradiation zone is located at the periphery of the bearing surface. The excitation beam is used to irradiate the annular irradiation zone. A groove is disposed on the bearing surface. The groove is partially located at the annular irradiation zone. The reflection member is disposed in the groove to reflect the excitation beam. The at least one phosphor layer is disposed at the annular irradiation zone to convert the excitation beam into at least one converted light beam. The illumination beam includes the converted light beam and the excitation beam reflected by the reflection member.

In the phosphor wheel and the projector of the embodiment of the invention, since the groove is disposed on the bearing surface of the disk plate and the reflection member is disposed in the groove, the reflection member may be used to assist heat dissipating, enhance the rigidity of the disk plate, and improve the dynamic balance. The reliability of the phosphor wheel is thereby increased.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
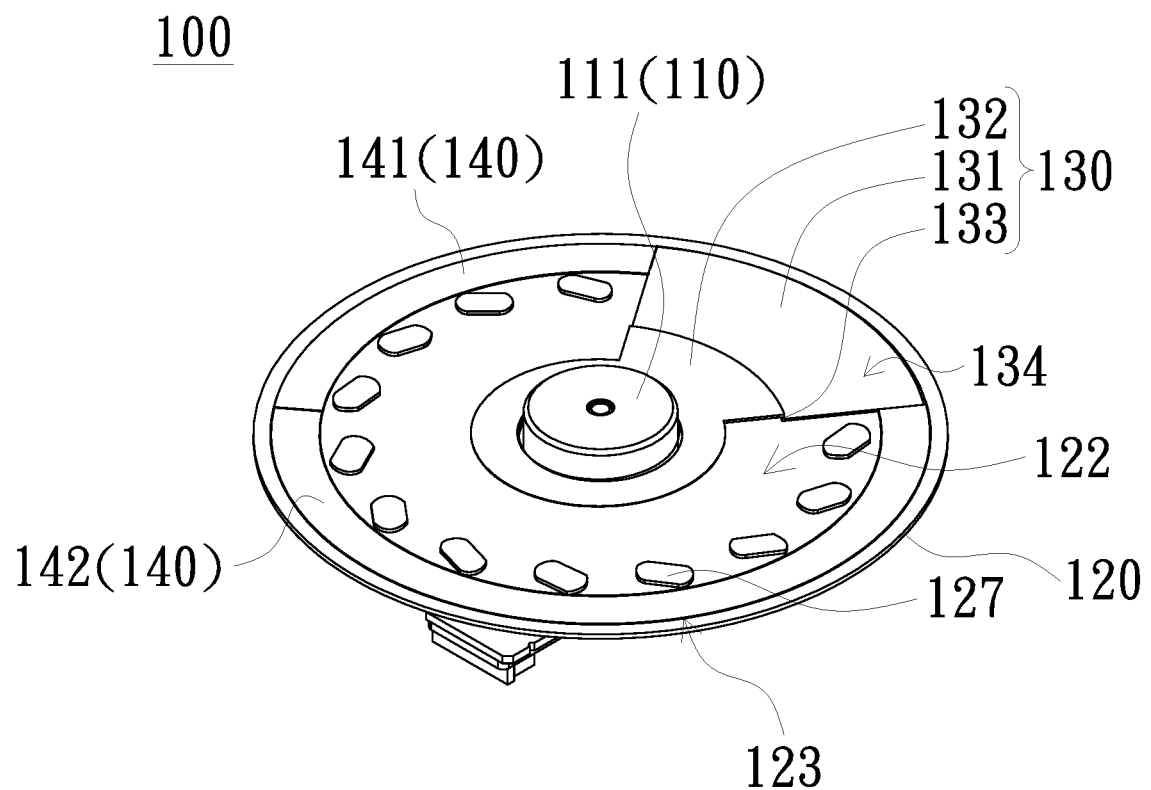
FIG. 1A is a schematic diagram of a phosphor wheel of an embodiment of the invention.
Figure 1B:
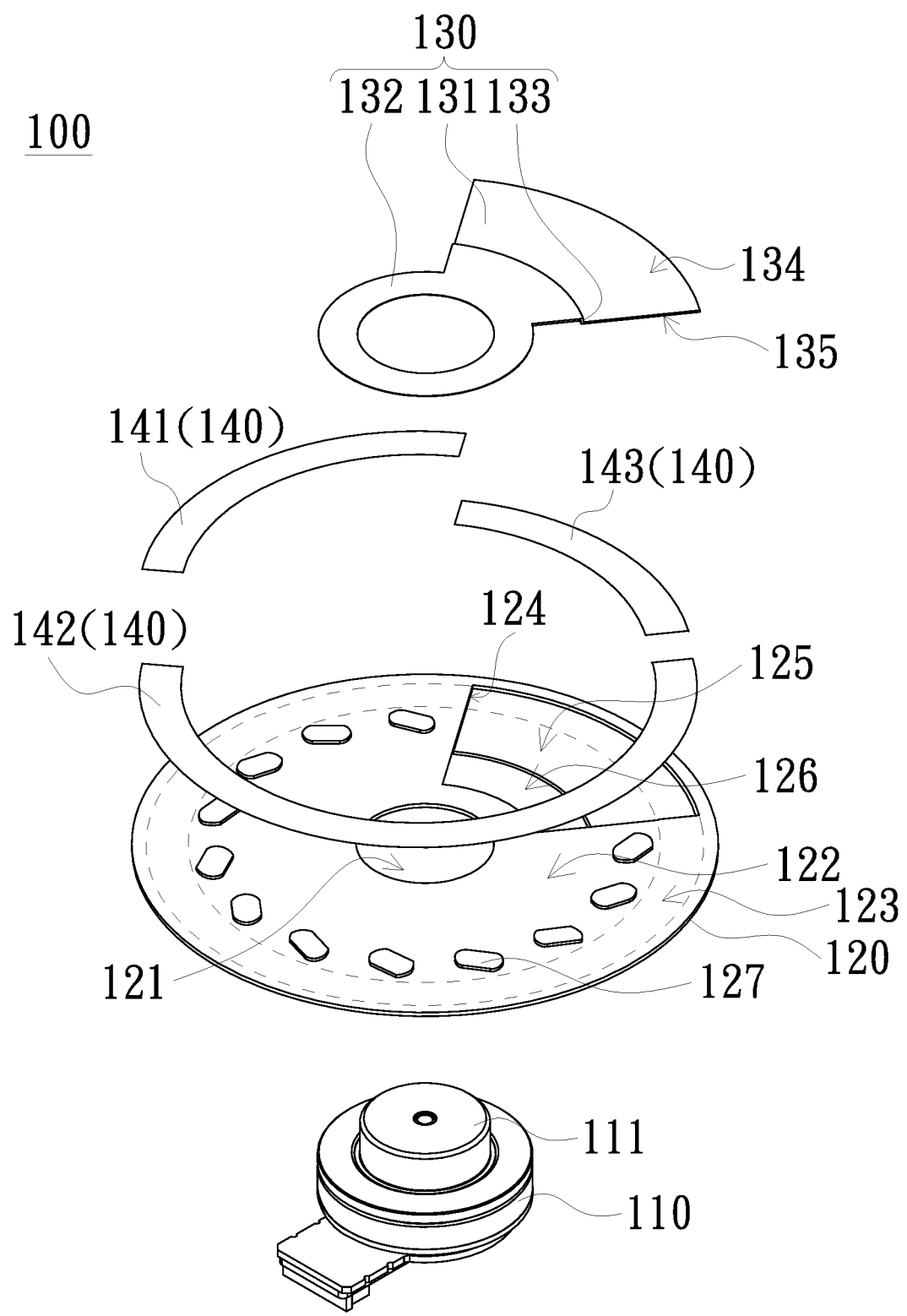
FIG. 1B is a schematically exploded view of the phosphor wheel of FIG. 1A.

FIG. 1A is a schematic diagram of a phosphor wheel of an embodiment of the invention. FIG. 1B is a schematically exploded view of the phosphor wheel of FIG. 1A. Please refer to FIG. 1A and FIG. 1B. The phosphor wheel 100 of the embodiment is used to generate a converted light beam after being excited by an excitation beam. The excitation beam is a laser beam provided by a blue laser diode (not shown). The phosphor wheel 100 includes a motor 110, a disk plate 120, a reflection member 130, and at least one phosphor layer 140. The at least one phosphor layer 140 is disposed facing the excitation beam. The motor 110 has a shaft 111. The disk plate 120 is connected to the shaft 111. An opening 121 is, for example, disposed at the center of the disk plate 120, such that the disk plate 120 is sleeved around the shaft 111. In addition, the disk plate 120 has a bearing surface 122. An annular irradiation zone 123 (indicated by dotted lines in FIG. 1B) is located at the periphery of the bearing surface 122. The annular irradiation zone 123 is an area pre-set to be irradiated by the excitation beam when the disk plate 120 is rotated. A groove 124 is further disposed on the bearing surface 122. The groove 124 is partially located in the annular irradiation zone 123.

The reflection member 130 is partially disposed in the groove 124 to reflect the excitation beam. The reflection member 130 has, for example, a sectoral reflecting portion 131 and an annular connecting portion 132. The annular connecting portion 132 is sleeved around the shaft 111. The sectoral reflecting portion 131 is disposed in the groove 124 and connected to the annular connecting portion 132. The shape of the sectoral reflecting portion 131 is, for example, matched with the profile of the groove 124, so that the reflection member 130 may be fixed onto the disk plate 120. In the embodiment, the reflection member 130 further has, for example, a bent portion 133. The bent portion 133 is an area that is bent downward from an edge of the annular connecting portion 132 and connected to an edge of the sectoral reflecting portion 131. That is, the sectoral reflecting portion 131 is connected to the annular connecting portion 132 through the bent portion 133. In addition, the materials of the disk plate 120 and the reflection member 130 may be metal or a light-transmissive material with a reflective coating which is favorable for heat dissipating, but may not limited thereto.

The at least one phosphor layer 140 is disposed at the annular irradiation zone 123. In the embodiment, the at least one phosphor layer 140 is, for example, disposed along the annular irradiation zone 123. For example, the at least one phosphor layer 140 includes, for example, phosphor layers 141, 142, and 143. The phosphor layer 141 is, for example, a phosphor layer for green. The phosphor layers 142 and 143 are, for example, phosphor layers for yellow. For example, a phosphor layer for green means that the excitation beam illuminates to the phosphor layer, the phosphor layer is excited to emit a converted light beam with green color. However, the colors of the converted light beams generated by the phosphor layer after being excited are not limited thereto. In other embodiments, the at least one phosphor layer may include only a phosphor layer that generates the converted light beam of one color, or alternatively include more phosphor layers that generate the converted light beams of more colors. For example, a phosphor layer for red color is further included.

In addition, a portion of the at least one phosphor layer 140 located in the groove 124 (i.e., the phosphor layer 143) is covered by the reflection member 130. The reflection member 130 has a reflection surface 134 corresponding to the annular irradiation zone 123 in the groove 124, so as to reflect the excitation beam. The reflection surface 134 may be a mirror-like or a matte surface depending on the design requirements. When the disk plate 120 is rotated, the excitation beam does not irradiate onto the phosphor layer 143, but the phosphor layers 141, 142 and the reflection surface 134 of the reflection member 130 by turns. The excitation beam is, for example, blue light, which is used to excite the phosphor layer 141 and generate green light when irradiated onto the phosphor layer 141, and excite the phosphor layer 142 and generate yellow light when irradiated onto the phosphor layer 142. The excitation beam is reflected by the reflection member 130 when irradiated onto the reflection member 130. In an embodiment, the phosphor layer 140 may be not disposed in the groove 124. In addition, for example, surfaces of the phosphor layers 141 and 142 for receiving the excitation beam are in the same reference plane as the reflection surface 134 of the reflection member 130 that receives the excitation beam.

In a conventional phosphor wheel, a disk plate is a one-piece structure, where the part of the annular irradiation zone without a phosphor layer is a reflection area. Due to the lack of the phosphor layer in the reflection area, the disk plate may be caused to be imbalanced in overall weight configuration, resulting in poor dynamic balance of the disk plate during rotating. In the phosphor wheel 100 of the embodiment, the groove 124 is disposed at the disk plate 120 and the reflection member 130 is disposed in the groove 124. By the weight of the reflection member 130 and that of the phosphor layer 143 selectively disposed, the overall weight configuration of the disk plate 120 may then be set such that the disk plate 120 may rotate well with dynamic balance. In addition, metal materials which are favorable for heat dissipating may be adapted for the disk plate 120 and the reflection member 130 to enhance the efficiency of heat dissipation, such that the problems of poor conversion efficiency and/or even breakdown of the phosphor layer 140 resulted from high temperature are avoided. With the above-mentioned advantages, the phosphor wheel 100 of the embodiment may have better reliability.

The bearing surface 122 may have a plurality of punched structures 127 located between the annular irradiation zone 123 and the shaft 111, so as to enhance the structural strength of the disk plate 120. The punched structure 127 is formed by punching the disk plate 120. In the embodiment, for example, the punched structure 127 is a raised structure protruding from the bearing surface 122. In other embodiments, the punched structure may be a recessed structure that forms a depression on the bearing surface 122, or a structure that includes raised structures and recessed structures.

The groove 124 has a bottom wall 125. The bottom wall 125 may have an opening 126 located between the annular irradiation zone 123 and the shaft 111. As such, when the disk plate 120 is rotated, the airflow can flow across a backside 135 (a surface opposite to the reflection surface 134, referring to FIG. 2) of the reflection member 130 via the opening 126 and the effect of heat dissipation is thereby enhanced. In an embodiment, the bottom wall 125 may not have the opening 126.

Figure 2:
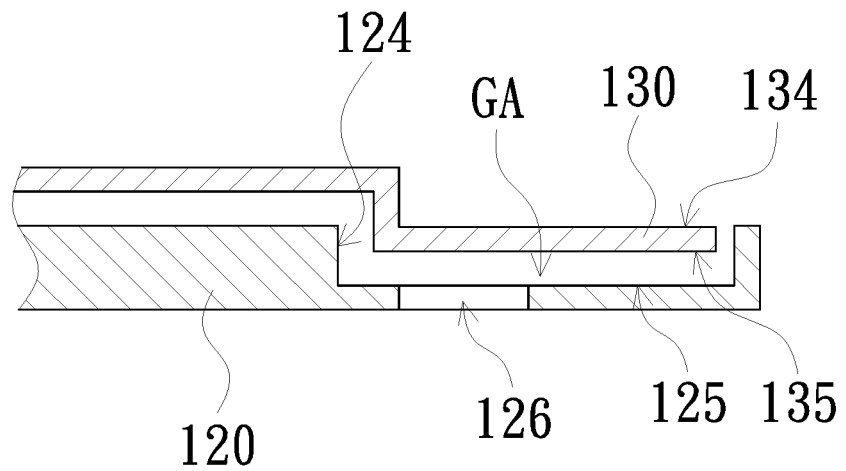
FIG. 2 is a schematically partial cross-sectional view of a reflection member and a disk plate of a phosphor wheel of an embodiment of the invention.

FIG. 2 is a schematically partial cross-sectional view of a reflection member and a disk plate of a phosphor wheel of an embodiment of the invention. Please refer to FIG. 2. In an embodiment, there can be an air gap GA between the reflection member 130 and the bottom wall 125 of the groove 124 of the disk plate 120. As such, when the disk plate 120 is rotated, the airflow may flow between the reflection member 130 and the disk plate 120 via the air gap GA, so the effect of heat dissipation can be enhanced. In another embodiment having the air gap GA, the bottom wall 125 may not have the opening 126.

Figure 3:
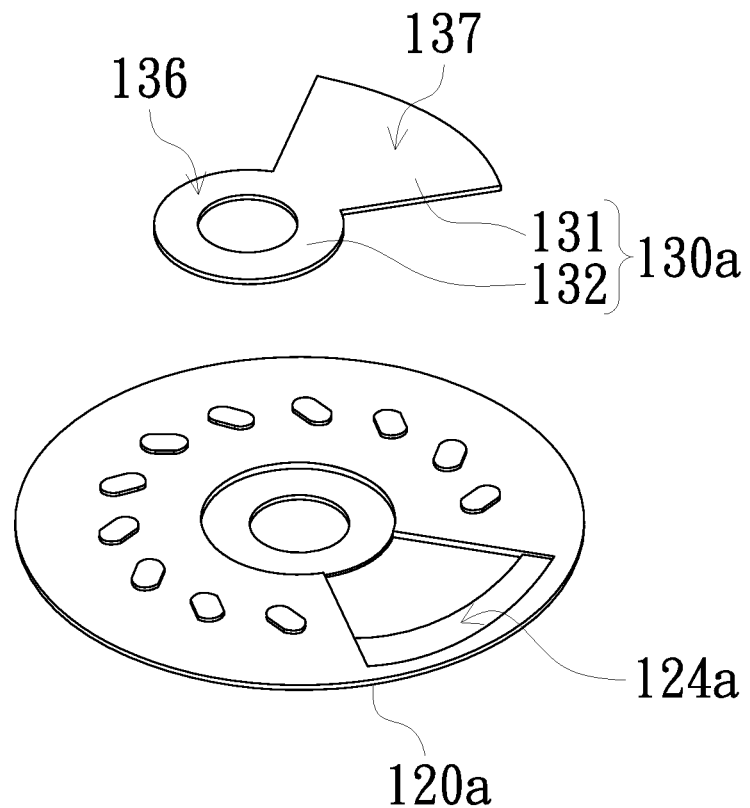
FIG. 3 is a schematically exploded view of a reflection member and a disk plate of a phosphor wheel of another embodiment of the invention.

Although in FIG. 1A and FIG. 1B, the reflection member 130 has a bent portion 133 between the annular connecting portion 132 and the sectoral reflecting portion 131, in another embodiment, as shown in FIG. 3, a reflection member 130a may include a sectoral reflecting portion 131 and the annular connecting portion 132 directly connected to each other without a bent portion therebetween. A surface 136 of the annular connecting portion 132 opposite to a disk plate 120a and a surface 137 of the sectoral reflecting portion 131 opposite to the disk plate 120a are, for example, coplanar. In addition, a shape of a groove 124a of the disk plate 120a may match the contour of the reflection member 130a.

Figure 4:
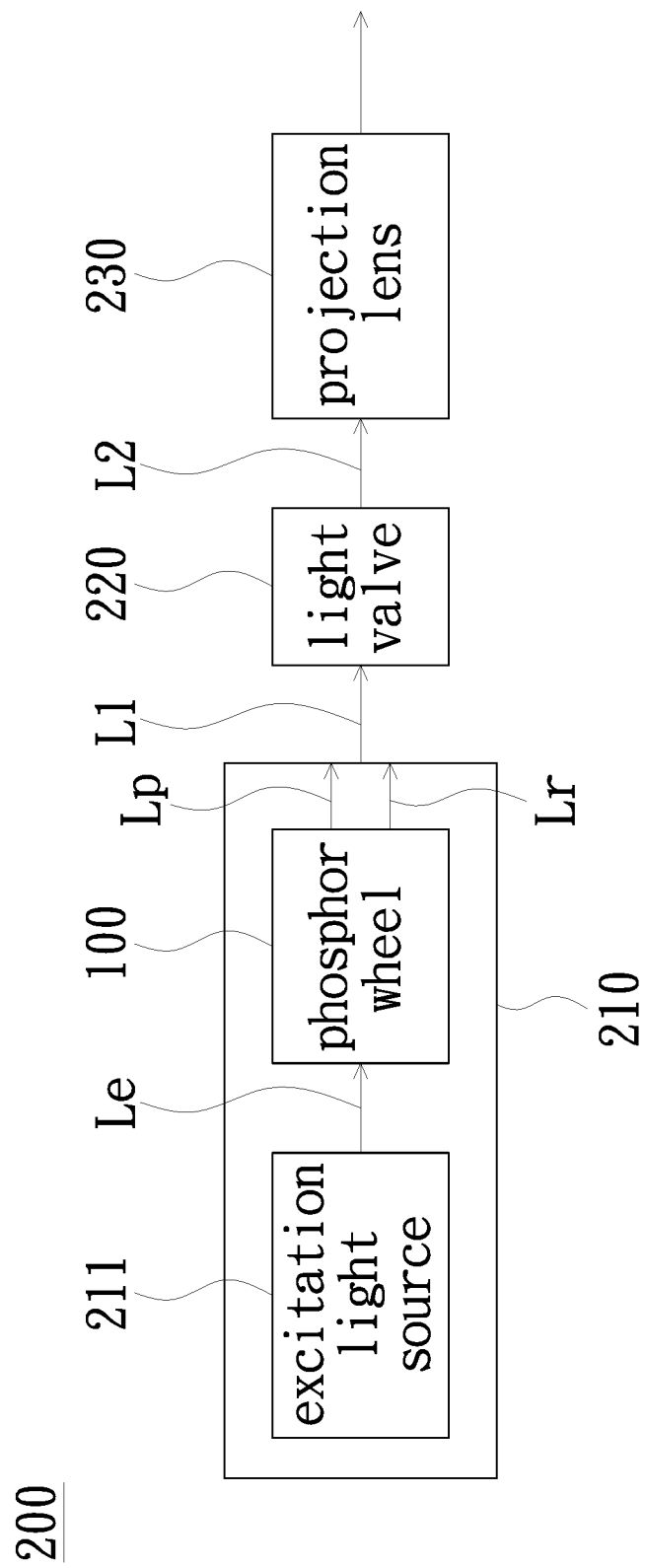
FIG. 4 is a schematic diagram of a projector of an embodiment of the invention.

FIG. 4 is a schematic diagram of a projector of an embodiment of the invention. Please refer to FIG. 4. The projector 200 of the embodiment includes an illumination system 210, a light valve 220, and a projection lens 230. The illumination system 210 is used to provide an illumination beam L1. The light valve 220 is disposed on a transmission path of the illumination beam L1 to convert the illumination beam L1 into an image beam L2. The projection lens 230 is disposed on a transmission path of the image beam L2 to project the image beam L2 to a screen (not shown). An image picture is thereby formed on the screen. The light valve 220 may be a transmissive light valve or a reflective light valve. The transmissive light valve may be a transmissive liquid crystal panel. The reflective light valve may be a digital micro-mirror device (DMD) or a liquid crystal on silicon panel (LCOS panel), but not limited thereto.

Please refer to FIG. 1A and FIG. 4. The illumination system 210 includes an excitation light source 211 and the phosphor wheel 100. The excitation light source 211 is used to provide an excitation beam Le. The phosphor wheel 100 is disposed on a transmission path of the excitation beam Le. Although the phosphor wheel 100 of FIG. 1A is applied in FIG. 4 for example, the phosphor wheel 100 may be replaced with a phosphor wheel of any one of the above-mentioned embodiments.

The excitation beam Le is used to irradiate the annular irradiation zone 123 of the phosphor wheel 100. With the rotation of the phosphor wheel 100, the at least one phosphor layer 140 on the annular irradiation zone 123 can convert the excitation beam Le into at least one converted light beam Lp. The reflection member 130 can reflect the excitation beam Le (an excitation beam reflected by the reflection member 130 is represented by Lr in FIG. 4). The illumination beam L1 includes the converted light beam Lp and the excitation beam Lr reflected by the reflection member 130. The illumination system 210 may further include other elements, so that the illumination beam L1 is transmitted to the light valve 220. In the following, the specific embodiment aspects of the illumination system 210 are further described in conjunction with the drawings. However, the specific architecture of the illumination system of the invention is not limited to the embodiments listed below.

Figure 5:
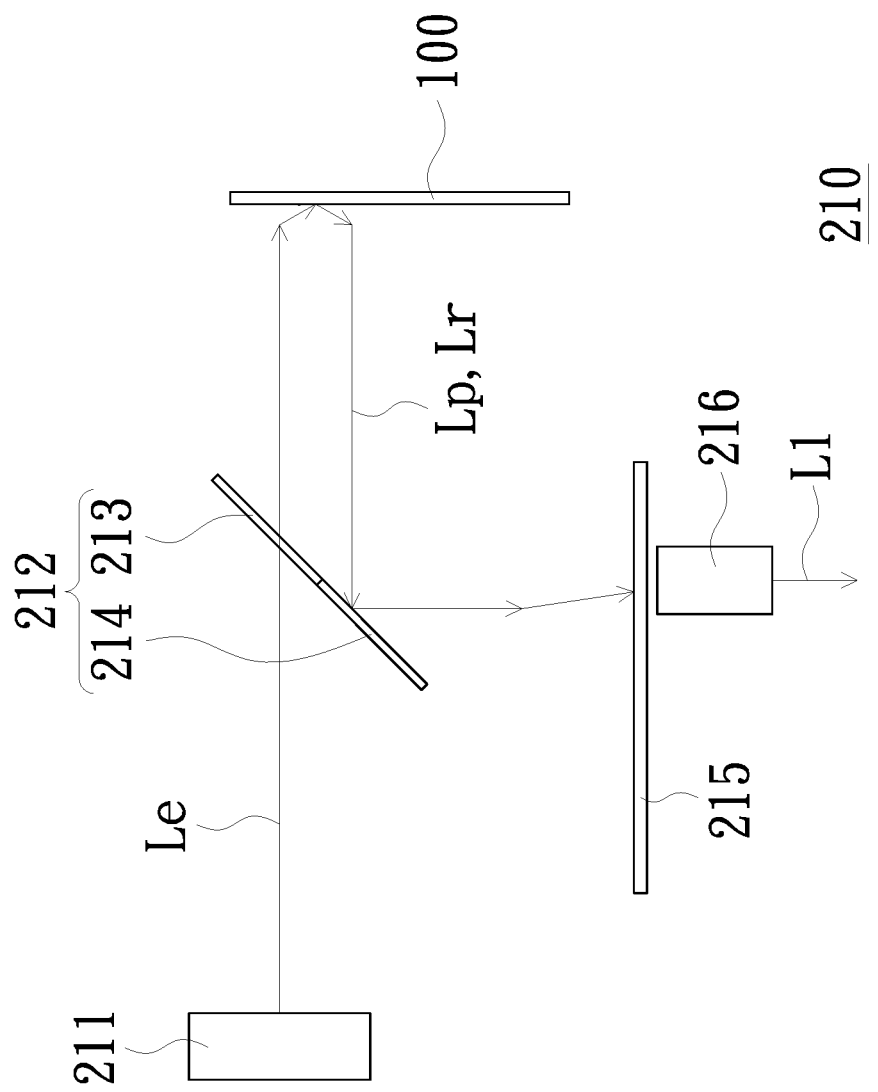
FIG. 5 is a schematic diagram of an illumination system of a projector of an embodiment of the invention.

FIG. 5 is a schematic diagram of an illumination system of a projector of an embodiment of the invention. Please refer to FIG. 5. The illumination system 210 of the embodiment may further include a light combining element 212, a filter wheel 215, and a light homogenization element 216 in addition to the excitation light source 211 and the phosphor wheel 100. The light homogenization element 216 may be a light integration rod or a lens array, but not limited thereto.

The light combining element 212 is disposed between the excitation light source 211 and the phosphor wheel 100 and includes a dichroic portion 213 and a reflecting portion 214. The dichroic portion 213 is adjacent to the reflecting portion 214. The excitation beam may penetrate the dichroic portion 213 and the converted light beam may be reflected by the dichroic portion 213. The excitation beam and the converted light beam may be reflected by the reflecting portion 214. The excitation beam Le provided by the excitation light source 211 passes through the dichroic portion 213 and is transmitted to the phosphor wheel 100. The converted light beam Lp and the excitation beam Lr reflected from the phosphor wheel 100 are transmitted to the light combining element 212. The excitation beam Lr is reflected by the reflecting portion 214 and sequentially passes through the filter wheel 215 and the light homogenization element 216. The converted light beam Lp is reflected by the reflecting portion 214 and the dichroic portion 213 and sequentially passes through the filter wheel 215 and the light homogenization element 216. Therefore, the illumination beam L1 provided by the illumination system 210 includes the converted light beam Lp and the excitation beam Lr.

Figure 6:
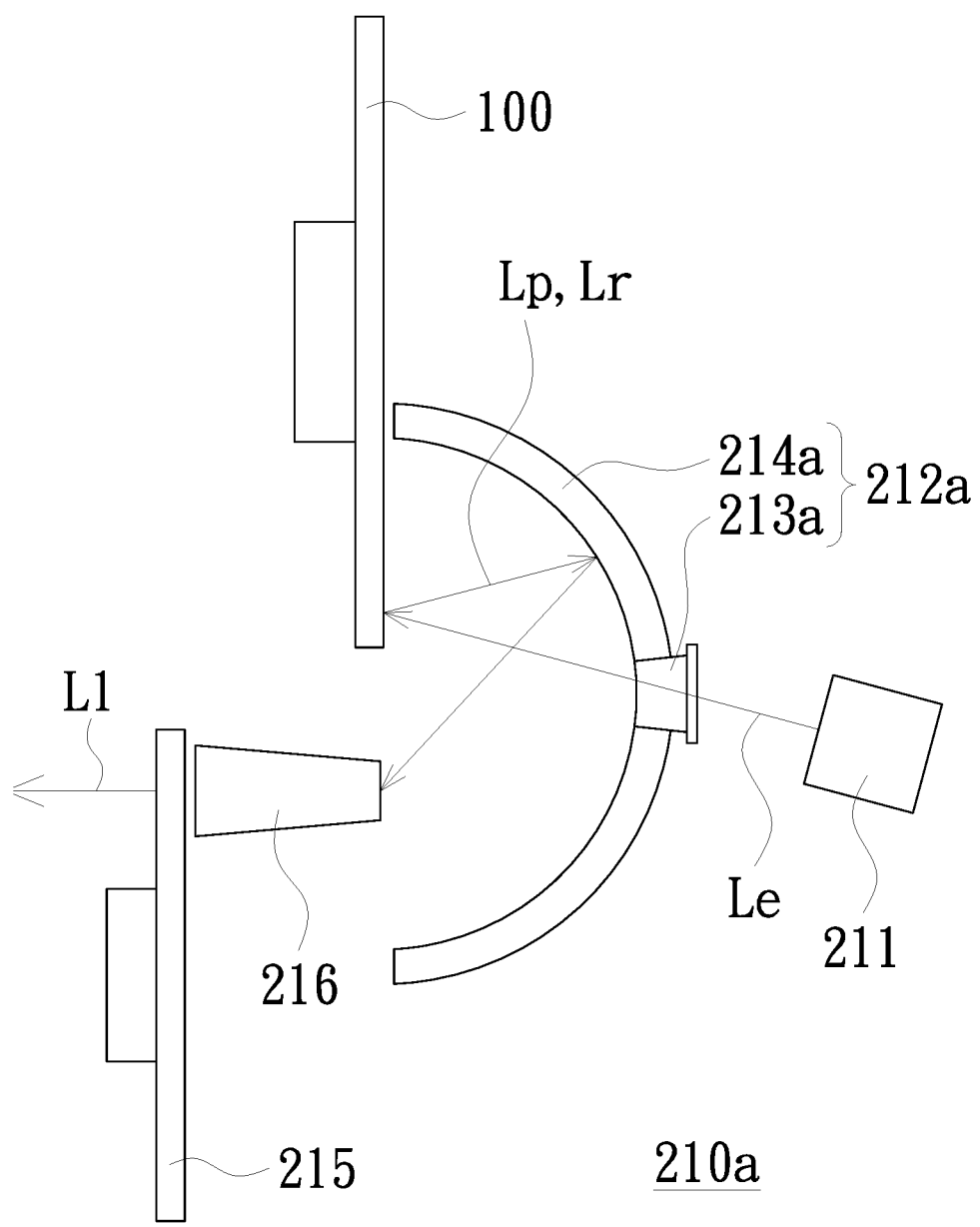
FIG. 6 is a schematic diagram of an illumination system of a projector of another embodiment of the invention.

FIG. 6 is a schematic diagram of an illumination system of a projector of another embodiment of the invention. Please refer to FIG. 6. An illumination system 210a of the embodiment is similar to the illumination system 210 of FIG. 5 and can also be applied to the projector of FIG. 4. The main difference lies in the light combining element. In the embodiment, a light combining element 212a is a cover constituted of a dichroic portion 213a and a reflecting portion 214a. The dichroic portion 213a is located at the top of the cover. The reflecting portion 214a surrounds the dichroic portion 213a. The excitation beam Le provided by the excitation light source 211 passes through the dichroic portion 213a and is transmitted to the phosphor wheel 100. The converted light beam Lp and the excitation beam Lr reflected from the phosphor wheel 100 are transmitted to the light combining element 212a. The excitation beam Lr is reflected by the reflecting portion 214a and sequentially passes through the light homogenization element 216 and the filter wheel 215. The converted light beam Lp is reflected by the reflecting portion 214 and the dichroic portion 213 and sequentially passes through the light homogenization element 216 and the filter wheel 215. Therefore, the illumination beam L1 provided by the illumination system 210a includes the converted light beam Lp and the excitation beam Lr.

Figure 7:
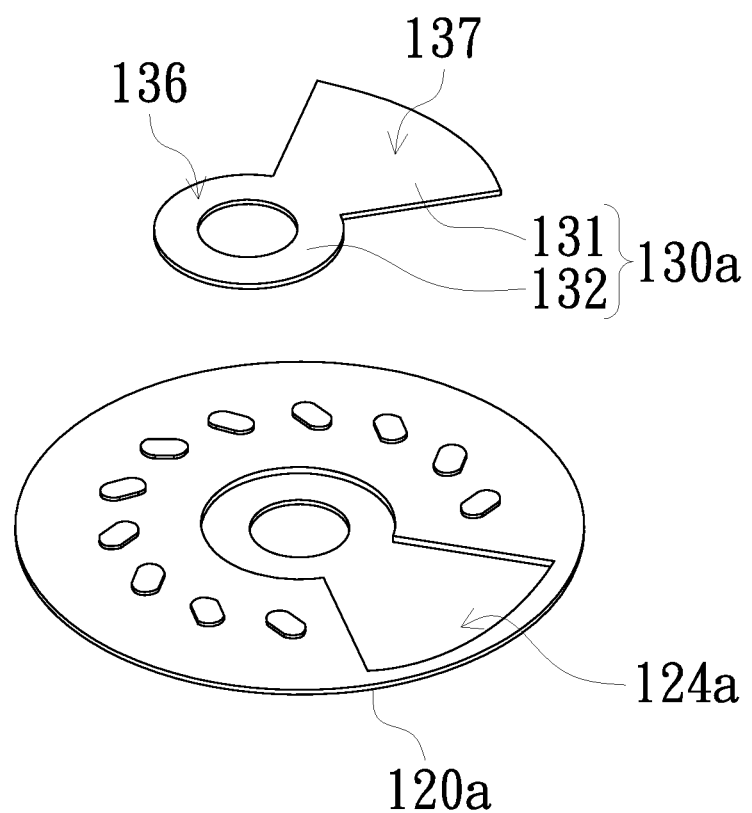
FIG. 7 is a schematically exploded view of a reflection member and a disk plate of a phosphor wheel of another embodiment of the invention.

FIG. 7 is a schematic exploded view of a reflection member and a disk plate of a phosphor wheel of another embodiment of the invention. In an embodiment, as shown in FIG. 1A and FIG. 7, the reflection member 130a includes the sectoral reflecting portion 131 and the annular connecting portion 132 directly connected to each other. In addition, a shape of the groove 124a of the disk plate 120a may match the contour of the reflection member 130a. The difference from the phosphor wheel of FIG. 3 is that, in FIG. 7, there is no opening disposed in the groove 124a of the disk plate 120a.

In summary, in the projector and the phosphor wheel of the embodiment of the invention, since the groove is disposed on the bearing surface of the disk plate and the reflection member is disposed in the groove, heat dissipation can be assisted by the reflection member. The rigidity of the disk plate is enhanced and the dynamic balance is improved. The reliability of the phosphor wheel is thereby increased. In addition, the effect of heat dissipation can be further enhanced by an opening at the bottom wall of the groove of the disk plate and/or by an air gap between the reflection member and the bottom wall of the groove of the disk plate. In addition, by forming a plurality of punched structures on the disk plate, the rigidity of the disk plate can be further enhanced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A phosphor wheel, comprising:
a motor, having a shaft;
a disk plate, connected to the shaft, wherein the disk plate has a bearing surface, an annular irradiation zone is located at a periphery of the bearing surface, a groove is disposed on the bearing surface, and the groove is partially located at the annular irradiation zone;
a reflection member, partially disposed in the groove; and at least one phosphor layer, disposed at the annular irradiation zone, wherein the groove has a bottom wall, and there is an air gap between the reflection member and the bottom wall.

2. The phosphor wheel according to claim 1, wherein the at least one phosphor layer covers along the annular irradiation zone, and a portion of the at least one phosphor layer located in the groove is covered by the reflection member.

3. The phosphor wheel according to claim 1, wherein the bottom wall has an opening located between the annular irradiation zone and the shaft.

4. The phosphor wheel according to claim 1, wherein the reflection member has an annular connecting portion and a sectoral reflecting portion, the annular connecting portion is sleeved around the shaft, and the sectoral reflecting portion is disposed in the groove and connected to the annular connecting portion.

5. The phosphor wheel according to claim 4, wherein a surface of the annular connecting portion opposite to the disk plate and a surface of the sectoral reflecting portion opposite to the disk plate are coplanar.

6. The phosphor wheel according to claim 4, wherein the reflection member further has a bent portion, bent downward from an edge of the annular connecting portion and connected to an edge of the sectoral reflecting portion.

7. The phosphor wheel according to claim 1, wherein the bearing surface has a plurality of punched structures, located between the annular irradiation zone and the shaft.

8. The phosphor wheel according to claim 1, wherein a material of the disk plate and a material of the reflection member comprise metal.

9. The phosphor wheel according to claim 1, wherein the reflection member has a reflection surface corresponding to the annular irradiation zone, and the reflection surface is a mirror-like or a matte surface.

10. A projector, comprising:
an illumination system, providing an illumination beam, wherein the illumination system comprises:
an excitation light source, providing an excitation beam; and
a phosphor wheel, disposed on a transmission path of the excitation beam, wherein the phosphor wheel comprises:
a motor, having a shaft;
a disk plate, connected to the shaft, wherein the disk plate has a bearing surface, an annular irradiation zone is located at the periphery of the bearing surface, the excitation beam is used to irradiate the annular irradiation zone, a groove is disposed on the bearing surface further, and the groove is partially located at the annular irradiation zone;
a reflection member, partially disposed in the groove to reflect the excitation beam, wherein the groove has a bottom wall, and there is an air gap between the reflection member and the bottom wall; and
at least one phosphor layer, disposed at the annular irradiation zone and converting the excitation beam into at least one converted light beam, wherein the illumination beam comprises the converted light beam and the excitation beam reflected by the reflection member;
a light valve, disposed on a transmission path of the illumination beam and converting the illumination beam into an image beam; and
a projection lens, disposed on a transmission path of the image beam.

11. The projector according to claim 10, wherein the at least one phosphor layer is disposed along the annular irradiation zone, and a portion of the at least one phosphor layer located in the groove is covered by the reflection member.

12. The projector according to claim 10, wherein the bottom wall has an opening located between the annular irradiation zone and the shaft.

13. The projector according to claim 10, wherein the reflection member has an annular connecting portion and a sectoral reflecting portion, the annular connecting portion is sleeved around the shaft, and the sectoral reflecting portion is disposed in the groove and connected to the annular connecting portion.

14. The projector according to claim 13, wherein a surface of the annular connecting portion opposite to the disk plate and a surface of the sectoral reflecting portion opposite to the disk plate are coplanar.

15. The projector according to claim 13, wherein the reflection member further has a bent portion, bent downward from an edge of the annular connecting portion and connected to an edge of the sectoral reflecting portion.

16. The projector according to claim 10, wherein the bearing surface has a plurality of punched structures, located between the annular irradiation zone and the shaft.

17. The projector according to claim 10, wherein a material of the disk plate and a material of the reflection member comprise metal.

18. The projector according to claim 10, wherein the reflection member has a reflection surface corresponding to the annular irradiation zone, and the reflection surface is a mirror-like or a matte surface.

* * * * *